United States Patent [19]

Shibatani et al.

[11] 4,295,549

[45] Oct. 20, 1981

[54] ANTI-RUST COVER FOR A DISC ROTOR OF A VEHICLE DISC BRAKE

[75] Inventors: Juichi Shibatani; Kenichi Nakamura; Wataru Izuhara; Yuichiro Obu, all of Toyota, Japan

[73] Assignee: Toyota Jidosha Kogyo Kabushiki Kaisha, Toyota, Japan

[21] Appl. No.: 49,748

[22] Filed: Jun. 18, 1979

[30] Foreign Application Priority Data

Dec. 26, 1978 [JP] Japan .......................... 53-178685[U]

[51] Int. Cl.³ .......................................... F16D 65/00
[52] U.S. Cl. .................................. 188/218 A; 188/2 R
[58] Field of Search ................... 188/1 R, 2 R, 18 A, 188/218 A, 264 AA, 264 G

[56] References Cited

U.S. PATENT DOCUMENTS 4,005,768 2/1977 Bubnash et al. ................ 188/218 A

FOREIGN PATENT DOCUMENTS 2814252 10/1978 Fed. Rep. of Germany ... 188/218 A

Primary Examiner—Duane A. Reger
Attorney, Agent, or Firm—Browdy and Neimark

[57] ABSTRACT

An improvement of an anti-rust cover for covering the outer side of a disc rotor of a vehicle disc brake. The anti-rust cover, which is capable of removably attached to the outer periphery of a dust cover, for covering the inner side of the disc rotor, at its outer periphery is characterized in that an engaging member disposed, on the inner surface and in the vicinity of the outer periphery, thereof for being engaged with the outer periphery of the dust cover, is utilized to afford a recess portion large enough to allow at least a part of a human finger to be held therein, and the anti-rust cover can be easily removed by means of holding a finger in the recess portion when required to be taken away.

14 Claims, 12 Drawing Figures

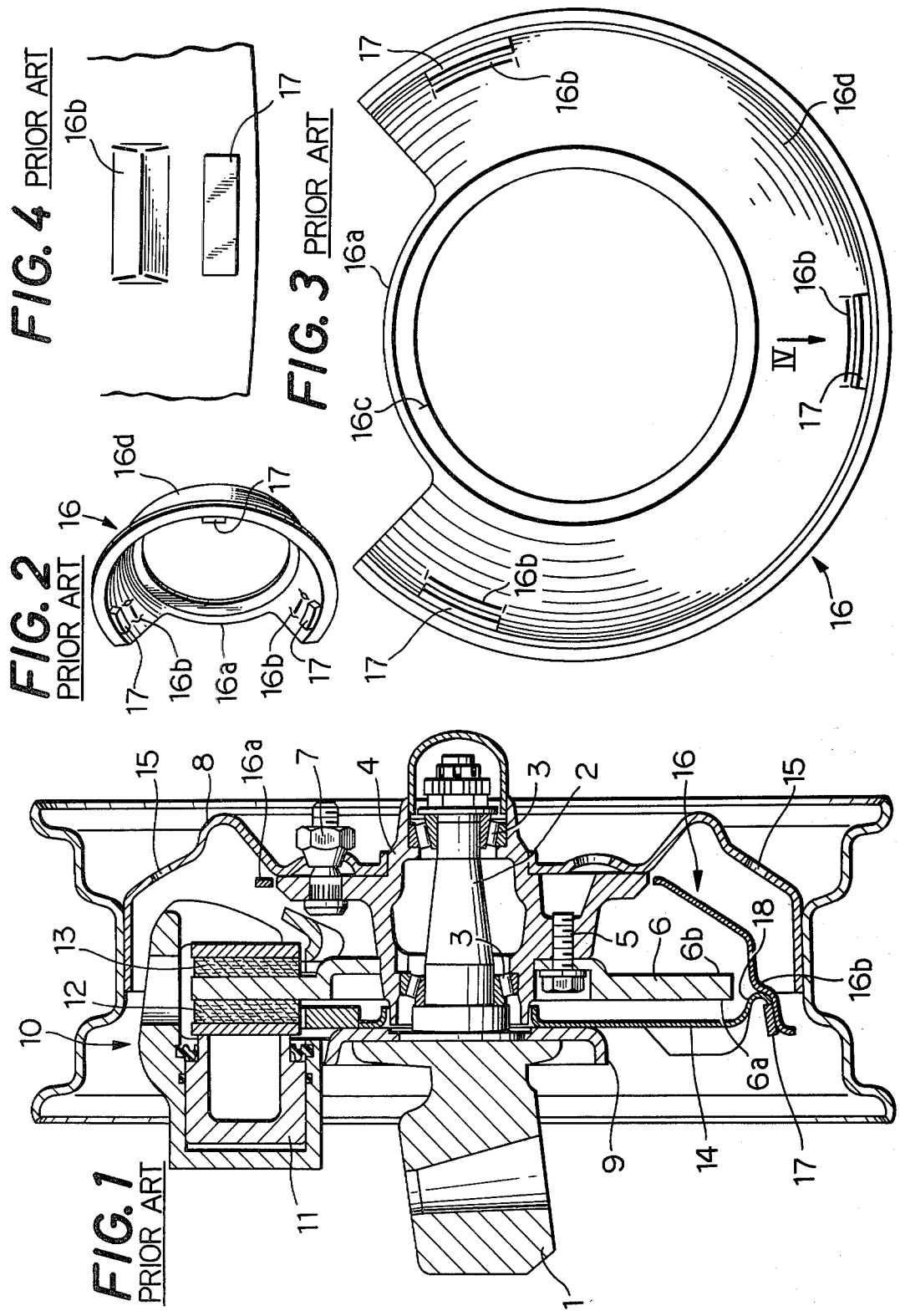

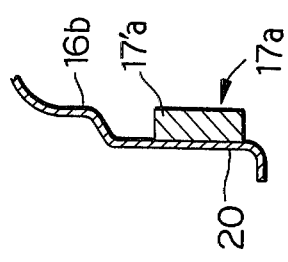
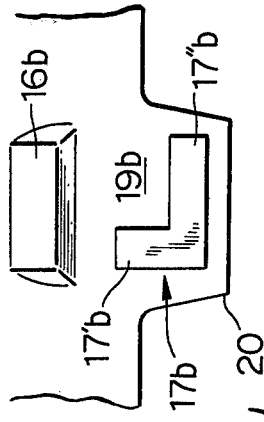
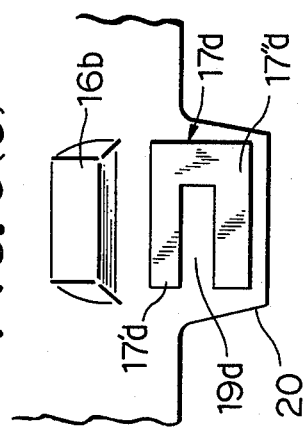
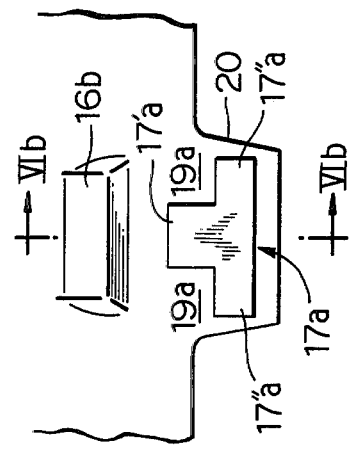
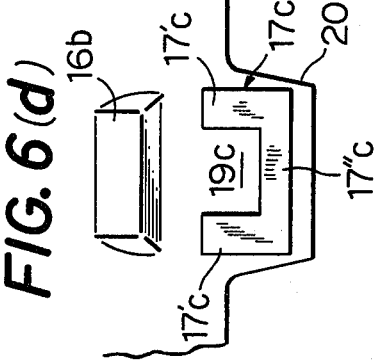
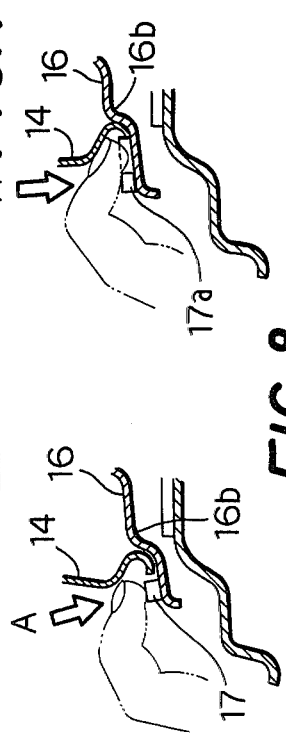
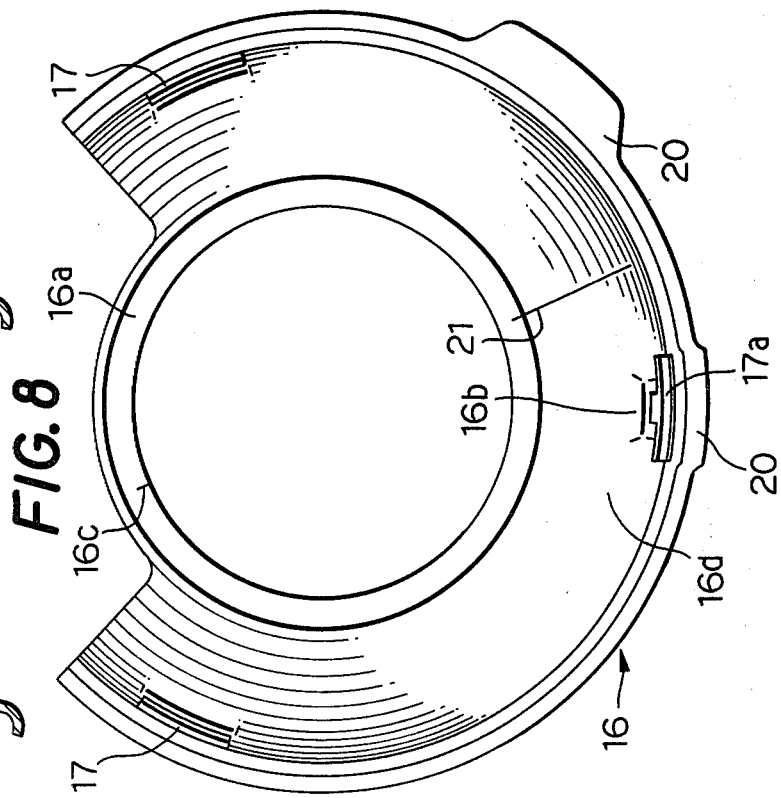

ANTI-RUST COVER FOR A DISC ROTOR OF A VEHICLE DISC BRAKE

BACKGROUND OF THE INVENTION

This invention relates to an anti-rust cover for a disc rotor of a vehicle brake.

As the disc rotor is normally made of cast iron, it is liable to produce rust. Particularly when a complete vehicle for exportation abroad is placed in the neighborhood of a pier while waiting for loading in an ocean going steamer, it is usually exposed to air containing salt. In the meantime the disc rotor is often subjected to salty sea wind to produce rust on it. The rust produced on the rotor induces a speedy wearing of the friction pads and a decrease of friction coefficient, leading to a problem of deterioration of braking effect.

For preventing the rust of this kind coating of some anti-rusting material on the surface of the rotor is thought of. The coating of the anti-rusting material is apt to cause a deterioration of the braking effect due to a decrease of friction coefficient. So the remnant anti-rusting material on the rotor after the delivery of a vehicle to a customer contains a dangerous problem. When the anti-rusting material is scraped off the rotor prior to the delivery the rust producing problem remains unsolved. For such reasons the coating of the anti-rusting material is generally regarded as impracticable.

As an effective step, instead of the coating of the anti-rusting material, an anti-rust cover has been widely practiced in order to physically protect the rotor, in cooperation with a dust cover which covers the inner side of the rotor (nearer side to the center of the vehicle chassis), in such a manner that the anti-rust cover is removably attached at its outer periphery to the outer periphery of the dust cover to completely envelop the rotor by covering the same from the outer side thereof. Such an anti-rust cover removably attached to the dust cover to protect the rotor from outside functions to prevent the salty sea wind from ingressing into the coverage, being effective in rust prevention of the rotor.

Such an anti-rust cover is by no means of permanent use, but of temporary purpose used only while the vehicle is in an ocean going transportation route, i.e., anti-rusting of the rotor until the vehicle be delivered to the customer. It must be therefore removed from the vehicle immediately before the delivery. It is not such an easy job as it appears to remove the anti-rust cover from the vehicle, because it is confined within the wheel disc sandwiched between the rotor and the wheel disc, where the space is very narrow filled with several deterrent parts. The operator has to reach hand into this narrow space under the floor of the vehicle or work lying on his back beneath the vehicle in order to remove the anti-rust cover. If the vehicle is delivered with the anti-rust cover unremoved, the rotor may be overheated during the running of the vehicle and sometimes may cause a fire or a deterioration of braking force. So the anti-rust cover must be removed by all means prior to the delivery.

SUMMARY OF THE INVENTION

This invention was made from such a background. It is an improvement of the anti-rust cover (hereinafter may be called sometime simply cover where no confusion is thought), wherein the cover can be extremely easily removed, without any additional parts to be attached or any specific tools to be used, only by exerting some device on the attaching structure of the same onto the dust cover.

It is an object of this invention to provide an improved anti-rust cover for a disc rotor of a vehicle disc brake, which anti-rust cover is to be attached at the outer periphery thereof to the outer periphery of the dust cover, which covers the inner side of the rotor, so as to cover the outer side of the rotor for enveloping the rotor from both sides, whereby an engaging member, disposed in the vicinity of the outer periphery of the anti-rust cover for being engaged by the outer periphery of the dust cover, has a recess portion large enough to allow at least a part of a human finger to be held therein for easily removing the anti-rust cover from the place.

BRIEF DESCRIPTION OF THE DRAWINGS

FIG. 1 is a cross-sectional view of a wheel of a vehicle provided with an anti-rust cover;

FIG. 2 is a perspective view of a conventional anti-rust cover;

FIG. 3 is an elevational view of a conventional anti-rust cover;

FIG. 4 is a projectional view of a part of FIG. 3 seen from the direction of arrow IV;

FIG. 5 is an explanatory view for explaining the removing operation of a conventional anti-rust cover;

FIGS. 6 (a), (b), (c), (d), and (e) are all modifications of the engaging member, in a status corresponding to FIG. 4, wherein (b) is a section of (a) taken along the sectional line VIb—VIb;

FIG. 7 is a similar explanatory view, corresponding to FIG. 5, regarding an anti-rust cover is accordance with this invention; and FIG. 8 is an elevational view of a preferred embodiment of an anti-rust cover.

DETAILED DESCRIPTION OF THE PREFERRED EMBODIMENTS

With reference to the appended drawings detailed description of the preferred embodiments will be made hereunder.

In a cross-sectional view of a wheel (herein a front wheel is exemplified) shown in FIG. 1, it will be seen that a wheel is provided with a knuckle 1, a shaft 2 secured to the knuckle 1, a hub 4 rotatably carried by the shaft 2 via bearings 3, a disc rotor 6 secured to the hub 4 by a bolt 5, a wheel disc 8 secured to the hub 4 by a bolt 7, a caliper supporter 9 secured to the knuckle 1, and a caliper which is secured to the caliper supporter 9 and generally designated by the numeral 10. The caliper 10 is composed of a piston 11 which is slidable in it, a friction pad 12 which is urged by the piston 11, and another friction pad 13 which is urged by a reactionary (depending) portion of the caliper 10. Braking operation is performed as is well known due to the squeezing of the rotor 6 by the both friction pads 12 and 13. On the caliper supporter 9 is secured a dust cover 14 in such a manner that the dust cover is confronted to the inner surface 6a of the rotor 6 for covering the same from the inner side. This dust cover 14 functions to protect the rotor 6 from being stuck with dust. On the other hand the wheel disc 8 is normally provided with an air introducing hole 15 for the purpose of cooling the disc brake, especially the rotor 6. When therefore a vehicle is placed in the neighborhood of a harbor for exportation in an ocean going steamer, sea air containing some salt may come into the wheel disc through the air introducing hole 15, which is apt to make the rotor 6, especially the outer surface 6b thereof which is exposed to the atmospheric air, rusty. The rust on the surface of the rotor 6 is produced in this way.

For preventing this kind of rust the anti-rust cover 16 has been conventionally practiced to cover the outer surface 6b of the rotor 6 by disposing the same between the rotor 6 and the wheel disc 8. This cover 16 is generally of a truncated cone type shape, having an annular hat portion 16d with a gentle slope. The hat portion 16d is partly cut away, as can be seen in FIGS. 2 and 3, in order to embrace the caliper 10 in this cut-away portion, consequently forming a bridge portion 16a with a narrowed width.

The cover 16 is also provided on its inner surface, in the vicinity of the outer periphery thereof, with a plurality pairs of (in this instance three) receiving device, for being snapped in by the outer periphery 18 (peripheral trough-shaped portion) of the dust cover 14 when the cover 16 is attached thereto, composed of a projection 16b protruding toward inside and a rectangular piece of plate called a clip 17 (engaging member) disposed nearer than the projection 16b to the outer periphery of the cover 16. Those plurality pairs of the projection 16b and the clip (engaging member) 17 are arranged, with a predetermined distance therebetween, circumferentially at a predetermined phase difference to each other. With this structure the cover 16 can be easily attached to and detached from the dust cover 14.

As the cover 16 is of temporary purpose only until the vehicle is delivered to the customer, it is preferable to be quite easy in attaching and detaching, low in manufacturing cost, and also light in weight. It has been chiefly made of a synthetic resin such as polyvinylchloride, polyethylene, polypropylene, etc., or cardboard (impregnated with wax when necessitated).

When the cover 16 of this type is removed, it becomes necessary to pull out the same in the radial direction thereof (lower side in FIGS. 1 and 3), holding the same with a hand at one end thereof polarly opposite from the bridge portion 16a, so that the cover 16 may be broken at the bridge portion 16a.

In the conventional cover 16, however, there is no place on which a finger is held, rendering the removal operation very awkward. Not only was it very difficult to pull the cover 16 out, but also there occurred sometimes a happening of breaking off only the holding portion of the cover 16, without the expected breaking open of the bridge portion 16a, when the cover 16 was pulled at a not-reinforced portion with the clip (engaging member) 17 too strongly or heedlessly. As the material of the cover 16 is not so strong because of its temporary purpose, so the same may be partly left there unremoved completely when the detaching operation is not good as mentioned above, leaving an undesirable problem.

This invention was started from noticing of a fact that the cover 16 is provided with the receiving device composed of the projection 16b and the clip (engaging member) 17 and that the cover 16 itself is reinforced at the place where those members are arranged, and the skilful utilization of the clip 17 as a finger holding place became the gist idea of the present invention. It resulted in facilitating the finger holding on the cover 16 when the cover 16 should be removed.

In the prior art the cover 16 is pulled out, as shown in FIG. 5, by holding a finger on the clip 17 of rectangular form, as in FIG. 4, in the direction of the arrow A; in this invention the clip 17, as an engaging member for being fitted in by the outer periphery of the dust cover 14, is modified in various shapes as shown in FIG. 6 (a) to (e) such as inverted T-shape 17a, L-shape 17b, U-shape 17c, sideways U-shape 17d, etc. The clips 17a–17d of such various shapes are so formed as to include an engaging portion 17′a–17′d for engaging in abutment with the outer periphery of the dust cover 14 and a finger holding portion 17″a–17″d for allowing formation of a recess portion 19a–19d, between the finger holding portion (17″a–17″d) and the outer periphery of the dust cover 14 to be engaged or the engaging portion (17′d), in which recess portion (19a–19d) at least a part of a human finger can get into for applying a force.

In an inverted T-shape clip 17a shown in FIG. 6 (a) a pair of recesses 19a on both sides of the engaging portion 17′a allow a part of two fingers to be put-in respectively like the illustration in FIG. 7, and the finger holding portion 17″a also allows the fingers to be firmly settled, which ensures the holding of the peripheral portion of the cover 16 by the hand and the fixing of the fingers in place. It makes the pulling out of the cover 16 in the radial direction, as shown with an arrow A, sure and makes the breaking open of the bridge portion 16a sure, leading to an ensured removal of the cover 16. This invention is thus largely characterized in having succeeded in a great improvement of the removal operability (easiness of operation) of the cover 16, only by means of adding a device (design), without any additional specific tools or parts, to the configuration of the engaging member (clip 17), which is attached to the peripheral end portion of the cover 16 where the same be engaged by the duct cover 14, whereby the engaging member (clip 17) concurrently functions as a clipping member to engage the cover 16 to the peripheral end portion of the dust cover 14 and as a finger holding portion 17″a when the cover 16 is removed or taken away.

In this embodiment a tongue portion 20 is integrally formed with the cover 16 and extended in an almost same direction as the cover surface. And the clip 17a–17d of predetermined configuration is attached to the cover 16 by a clipping means in a crossing manner over the tongue portion 20, so the recess 19a–19d formed by the clip 17a–17d affords a space for a part of a finger to be put in. Easiness of putting-in a part of the finger there, i.e., in the recess formed in this way on the cover 16, makes the operation of removing the cover 16 quite smooth or hitchless.

Some other effective devices can be added to this kind of anti-rust cover 16, beside the above-mentioned configurational variation of the engaging member (the clip). A preferable embodiment is being shown in FIG. 8, wherein an inverted T-shape clip 17a is disposed on the tongue portion 20 extended from the hat portion 16d which is positioned polarly opposite from the central part of the bridge portion 16a (point-symmetrical position about the center of the cover 16), and a downward (in FIG. 8) pulling operation, in this instance, of the cover 16 by holding a finger (normally two fingers) on the clip 17a of inverted T-shape and pinching the tongue portion 20 is very effective in breaking open the cover 16 at the bridge portion 16a. Disposition of the clip 17a on the hat portion (an area extending in an almost same length as the bridge portion 16a with its center at the installation place of the clip 17a in FIG. 8), positioned at symmetrically opposite place of the bridge portion 16a, in which hat portion 16d the finger is held and the largest pulling force is applied, makes the removal operation much easier. And the clip 17 disposed on the hat portions 16d on the right and left sides of the bridge portion 16a, not so far therefrom, is of rectangular form like the conventional one (see FIG. 4), as it is not for holding a finger thereon, but only for retaining the dust cover 14.

The anti-rust cover 16 of this kind is further provided a first slit 16c at a suitable place in the bridge portion 16a and a second slit 21, between two of the tongue portions 20, 20 (on one of which a clip 17a is attached) located in the hat portion 16d which is confrontedly disposed to the bridge portion 16a, extending in the radial direction of the cover 16. The cover 16 can be broken open, when it is removed, into two pieces at the place of those two slits 16c and 21. Taking out those two broken pieces one after another makes therefore the removal operation further speedy and smooth.

Although the second slit 21 is positioned at a diametrically opposite place from the first slit 16c, the position may be suitably chosen within the hat portion 16d confrontedly positioned to the bridge portion 16a; and those slits 16c and 21 may be either of through slit type or non-through type (only a groove). It is also permissible to dispose plural slits more than two in order to break the cover 16 into pieces more than two for the convenience of taking it out. Furthermore, it is also preferable to dispose two tongue portions 20 extending outwardly from the outer periphery of the cover 16 on both sides of the second slit 21 as shown in FIG. 8 for facilitating the taking out of the broken pieces of the cover 16.

As described above the anti-rust cover 16 in FIG. 8 possesses various merits, in addition to that due to the recess(es) formed by the engaging member (clip) of predetermined configuration, ascribable to the tongue portion(s) 20 and two types of slits 16c, 21, which enhances the removable operability a great deal. It goes without saying that a combining either of the tongue portion or slit with the engaging member is also much better than a cover wherein the engaging member is utilized alone.

This invention is not limited at all to the embodiments described above, which are only for exemplifying the invention. Many variations or modifications are of course made without departing from the spirit and sphere of the invention.

This invention has greatly improved the easiness of taking out the anti-rust cover from the wheel, contributing remarkably to the automobile industry, by means of a device applied to the betterment of the engaging member, specifically by having made the recess formed by the engaging member available for holding a finger when the cover is removed.

What is claimed is:

1. In an anti-rusting mechanism, for a disc rotor in a vehicle disc brake, including an anti-rust cover removably attached at the outer periphery thereof to the outer periphery of a dust cover which covers the inner surface of said disc rotor integrally rotatable with a wheel, said anti-rust cover covering the outer surface of said disc rotor to envelope said disc rotor in cooperation with said dust cover, an improvement wherein said anti-rust cover is provided with a plurality of engaging members disposed, for being engaged with the outer periphery of said dust cover, on the surface faced to said disc rotor and in the vicinity of the outer periphery of said anti-rust cover with a predetermined circumferential phase difference from each other, and a plurality of projections disposed on the surface of said anti-rust cover respectively in confrontation with each of said engaging members at a nearer position to the center of said anti-rust cover than said engaging member, and at least one of said engaging members has a recess portion large enough to allow at least a part of a human finger to be held therein when said anti-rust cover is removed, and said anti-rust cover can be removably attached to said dust cover by means of allowing the outer periphery of the latter to fit snappingly between said at least one engaging member and a corresponding one of said projections at each place.

2. An improvement of the invention claimed in claim 1 characterized in that said engaging member is so shaped as to have at least one recess, when it abuts the outer periphery of said dust cover, for affording a space large enough for at least a part of a human finger to be held therein.

3. An improvement of the invention claimed in claim 1 characterized in that said engaging member includes an engaging portion where the same abuttingly engages with the outer periphery of said dust cover and a finger holding portion, which is formed between said engaging member and the outer periphery of said dust cover, large enough to be a recess affording a space for at least a part of a human finger to be held therein.

4. An improvement of the invention claimed in claim 2 characterized in that said engaging member is of inverted T-shape, the end of a leg portion of said inverted T-shape engaging member constitutes the engaging portion for abuttingly engaging with the outer periphery of said dust cover, and a head portion thereof perpendicularly positioned to said leg portion constitutes said finger holding portion.

5. An improvement of the invention claimed in claim 1 characterized in that said anti-rust cover is provided with said engaging member forming said recess for affording a space of finger holding portion in a hat portion of annular configuration, which is positioned on the diametrically opposite side from an arcuate bridge portion formed by partly narrowing said hat portion of annular configuration.

6. An improvement of the invention claimed in claim 1 characterized in that said anti-rust cover is provided with an integrally formed tongue portion extending outwardly from the outer periphery thereof, and said engaging member for forming said recess to afford a space of finger holding portion is disposed in a crossing manner over the transition portion from the outer periphery to the tongue portion of said anti-rust cover.

7. An improvement of the invention claimed in claim 1 characterized in that said anti-rust cover is provided with a slit formed in an arcuate bridge portion which is formed by partly cutting away, in a manner of narrowing the width of, a hat portion of annular configuration constituting the principal part of said anti-rust cover of generally truncated cone shape with a gentle slope.

8. An improvement of the invention claimed in claim 7 characterized in that said anti-rust cover is provided with a second slit formed in the hat portion of annular configuration in the radial direction of said anti-rust cover.

9. An improvement of the invention claimed in claim 8 characterized in that said anti-rust cover is provided with, in said hat portion on both sides of said second slit, two of integrally formed tongue portions respectively extending outwardly from the outer periphery of said anti-rust cover.

10. In an anti-rusting mechanism, for a disc rotor in a vehicle disc brake, including an anti-rust cover removably attached at the outer periphery thereof to the outer periphery of a dust cover which covers the inner surface of said disc rotor integrally rotatable with a wheel, said anti-rust cover covering the outer surface of said disc rotor to envelope said disc rotor in cooperation with said dust cover, an improvement of said anti-rust cover characterized in that at least one engaging member disposed, for being engaged with the outer periphery of said dust cover, on the surface faced to said disc rotor and in the vicinity of the outer periphery, of said anti-rust cover forms a recess affording a space for a human finger to be held therein when said anti-rust cover is removed, said one engaging member being so shaped as to have at least one recess, when it abuts the outer periphery of said dust cover, for affording a space large enough for at least part of a human finger to be held therein, said one engaging member being of, inverted T-shape, the end of a leg portion of said T-shape engaging member constitutes the engaging portion for abuttingly engaging with the outer periphery of said dust cover, and wherein a head portion thereof perpendicularly positioned to said leg portion constitutes said finger holding portion.

11. In an anti-rusting mechanism, for a disc rotor in a vehicle disc brake, including an anti-rust cover removably attached at the outer periphery thereof to the outer periphery of a dust cover which covers the inner surface of said disc rotor integrally rotatable with a wheel, said anti-rust cover covering the outer surface of said disc rotor to envelope said disc rotor in cooperation with said dust cover, an improvement of said anti-rust cover characterized in that at least one engaging member disposed, for being engaged with the outer periphery of said dust cover, on the surface faced to said disc rotor and in the vicinity of the outer periphery, of said anti-rust cover forms a recess affording a space for a human finger to be held therein when said anti-rust cover is removed, said anti-rust cover is provided with an integrally formed tongue portion extending outwardly from the outer periphery thereof, and said engaging member for forming said recess to afford a space of finger holding portion is disposed in a crossing manner over the transition portion from the outer periphery to the tongue portion of said anti-rust cover.

12. In an anti-rusting mechanism, for a disc rotor in a vehicle disc brake, including an anti-rust cover removably attached at the outer periphery thereof to the outer periphery of a dust cover which covers the inner surface of said disc rotor integrally rotatable with a wheel, said anti-rust cover covering the outer surface of said disc rotor to envelope said disc rotor in cooperation with said dust cover, an improvement of said anti-rust cover characterized in that at least one engaging member disposed, for being engaged with the outer periphery of said dust cover, on the surface faced to said disc rotor and in the vicinity of the outer periphery, of said anti-rust cover forms a recess affording a space for a human finger to be held therein when said anti-rust cover is removed, and said anti-rust cover is provided with a slit formed in an arcuate bridge portion which is formed by partly cutting away, in a manner of narrowing the width of, a hat portion of annular configuration constituting the principal part of said anti-rust cover of generally truncated cone shape with a gentle slope.

13. An improvement of the invention claimed in claim 12, characterized in that said anti-rust cover is provided with a second slit formed in the hat portion of annular configuration in the radial direction of said anti-rust cover.

14. An improvement of the invention claimed in claim 13, characterized in that said anti-rust cover is provided with, in said hat portion on both sides of said second slit, two of integrally formed tongue portions respectively extending outwardly from the outer periphery of said anti-rust cover.

* * * * *